United States Patent

Biermeier et al.

[11] Patent Number: 5,817,977
[45] Date of Patent: Oct. 6, 1998

[54] BUSBAR SYSTEM

[75] Inventors: Eberhard Biermeier, Solms; Mouhamadou Ousmane, Marburg; Hans Wagener, Dietzhölztal, all of Germany

[73] Assignee: Rittal-Werk Rudolf Loh GmbH & Co. KG, Herborn, Germany

[21] Appl. No.: 809,510
[22] PCT Filed: Mar. 1, 1996
[86] PCT No.: PCT/EP96/00869
§ 371 Date: Mar. 24, 1997
§ 102(e) Date: Mar. 24, 1997
[87] PCT Pub. No.: WO96/30984
PCT Pub. Date: Oct. 3, 1996

[30] Foreign Application Priority Data

Mar. 28, 1995 [DE] Germany .................. 195 11 283.0

[51] Int. Cl.⁶ .................................................. H02G 3/04
[52] U.S. Cl. ............................................................. 174/68.2
[58] Field of Search ............................. 174/68.2, 48, 50, 174/97; 138/92

[56] References Cited

U.S. PATENT DOCUMENTS 5,274,194  12/1993  Belcher ...................................... 174/50
5,629,496   5/1997  Navazo ...................................... 174/48

FOREIGN PATENT DOCUMENTS 455563    11/1991  European Pat. Off. .
3811456   10/1989  Germany .
9103262    7/1991  Germany .
2 253 096  8/1992  United Kingdom ..................... 174/97

Primary Examiner—Kristine L. Kincaid
Assistant Examiner—Joseph Waks
Attorney, Agent, or Firm—Speckman Pauley Petersen & Fejer

[57] ABSTRACT

A busbar system with busbars fitted in a trough-like lower securing section extending over a length. A clamping arm perpendicular is secured to a securing surface of the lower securing section on which adapters fitted with terminals can be fitted and covered. The adapters can be secured to the lower securing section by mechanical catches. This invention improves mechanical securing of covers and adapters because the lower securing section has an outer wall and an inner wall longitudinally on both sides forming a longitudinal catch recess. The outer walls also have an outwardly directed longitudinal catch web, and retaining springs with catch webs of the side walls of the cover and adapter housing that run parallel to the busbars can be engaged in the longitudinal catch apertures and additional components securable to the adapter housing can engage with retaining springs on the outwardly directed longitudinal catch webs of the outer walls of the lower securing section as a tilting safeguard.

8 Claims, 2 Drawing Sheets

BUSBAR SYSTEM

BACKGROUND OF THE INVENTION

1. Field of the Invention

This invention relates to a busbar system with busbars, which are disposed in a trough-shaped lower fastener element extending over a length of the busbars and having a clamping leg extending vertically with respect to the fastening surface, into which adapters, having contacts, can be plugged and covered, wherein the adapters can be secured by mechanical detent connectors.

2. Description of Prior Art

A conventional busbar system is known from German Patent Reference DE 38 11 456 C2. In this case the covers and adapters are connected with the lower fastener element by mechanical connections designed as detent connectors. Since the electrical connection between the connecting terminals and the clamping legs of the busbars themselves are not locked or snapped together, the mechanical connection is crucial. With large and heavy adapters in particular, there is a danger that the mechanical connection can be loosened or released on one side.

SUMMARY OF THE INVENTION

It is one object of this invention to provide a busbar system of the conventional type but with a mechanical connection between the fastening element and the cover and the adapters placed thereon which is considerably improved.

In accordance with this invention this object is achieved with a lower fastener element having an outer wall and an inner wall on both sides, which form a longitudinally oriented detent recess. The outer walls also have an outwardly oriented longitudinal detent strap, the detent springs have the detent straps of the lateral walls of the cover and the adapter housings extend parallel with the busbars and can be locked into the longitudinally extending detent recesses. Additional elements, which can be fixed on the adapter housing, lock into the outwardly oriented longitudinal detent straps of the outer walls of the lower fastener element using detent springs to form a tilting safeguard. With the additional elements which can be fixed on the adapter housings, the outer walls are prevented from yielding toward the outside at all places where adapters are connected with the busbars. The detent springs of the cover and of the adapters locked into the longitudinally oriented detent recesses are thereby locked and these elements are connected with the lower fastener element in a secured manner with respect to tilting.

If the inner walls of the lower fastening element have longitudinal detent straps oriented toward the interior, and the holders receiving busbars are maintained in the lower fastener element by the inwardly oriented longitudinal detent straps of the inner walls, then the holders for the busbars can be locked into the lower fastener element. For axial securement it is then only necessary for the holders to be fixed in the lower fastener element by attachment screws, in an axially non-displaceable manner.

In order to assure a clear detent connection of the detent springs inserted into the longitudinally oriented detent recesses, in one embodiment the longitudinally oriented detent recesses have a stop, which limits the snap-in movement of the detent springs, which have a detent strap, of the cover and the adapter housing. In accordance with another preferred embodiment of this invention, the distribution of the detent elements and the stop in the detent recesses allows the detent straps to project into the detent recesses formed on the outer walls, and on the inner walls prevents projecting into the detent recesses, or vice versa.

In many cases an embodiment will be sufficient which is distinguished by detent springs, used as a tilting safeguard, of the additional elements which lock into the longitudinal detent strap of the outwardly oriented upper outer wall.

If the adapter is designed as an equipment adapter, a contact block which receives connecting terminals can be fixed on the adapter housing. If the contact block is closed by a cover, the latter can function as an additional element and can be used as a tilting safeguard by using a detent spring.

BRIEF DESCRIPTION OF DRAWINGS

This invention will be explained in view of an exemplary embodiment represented in the drawings wherein.

DETAILED DESCRIPTION OF PREFERRED EMBODIMENTS

Figure 1:
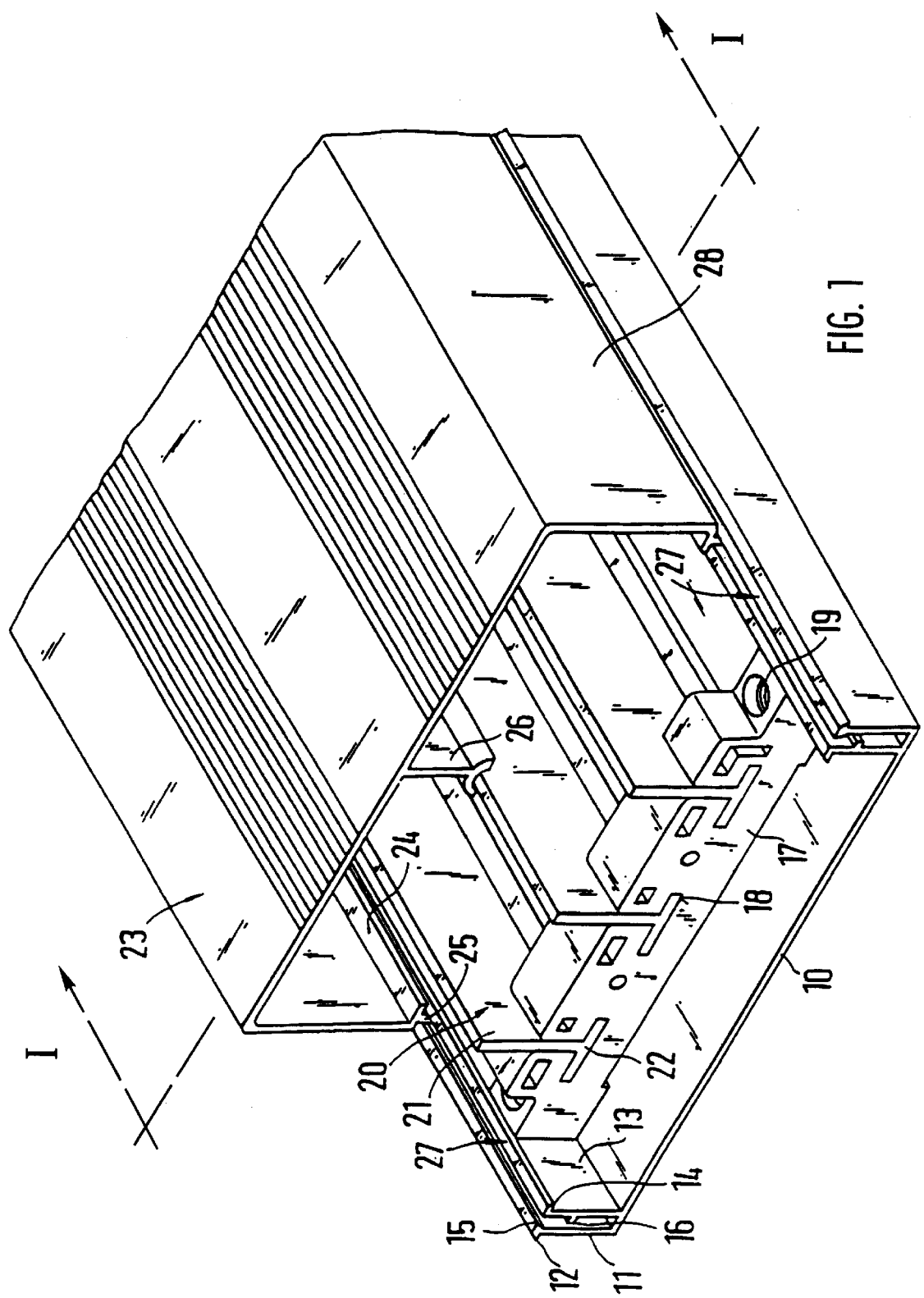
FIG. 1 is a partial perspective view of a lower fastener element with three busbars which are partially covered by a cover.

The busbar system shown in FIG. 1 is laid out with three poles. Three busbars 20 are housed in a trough-like lower fastener element 10. The longitudinal lateral walls of the lower fastener element 10 are embodied as double walls with respectively an outer wall 11 and an inner wall 13, and form longitudinally oriented detent recesses 27. In this case outwardly oriented longitudinal detent straps 12 are disposed on the outer walls 11, and inwardly oriented longitudinal detent straps 14 on the inner walls 13. The outer walls have stops 16 in the form of longitudinal straps in the detent recesses 27, which limit the insertion movement of detent springs, while the inner walls 13 have longitudinal detent straps 15 projecting into the detent recesses 27, or vice versa. In addition, the inner walls 13 support inwardly oriented longitudinal detent straps 14, which restrain holders 17 which are snapped into the lower fastener element 10 to receive the busbars 20. So that the holders 17 can be axially fixed in the lower fastener element 10, the holder 17 has attachment screws 19 for clamping the holder 17 between the bottom of the lower fastener element 10 and the longitudinal detent straps 14.

The holder 17 has receivers 18, T-shaped in cross section, into which the T-shaped busbars 20 with holding legs 22 and clamping legs 21 are pushed and held. The clamping legs 21 of the busbars 20 in this case extend vertically with respect to the fastening surface, such as the bottom of the lower fastener element 10.

At the places not occupied by adapters, the busbars 20 are covered, secured from touching each other, by means of covers 23. The lateral walls 28 of the covers 23 end in horizontally inward oriented strips 24, which support a detent spring 25. The detent springs 25 are snapped into the detent recesses 27, wherein the stops 16 limit the insertion movement.

Figure 2:
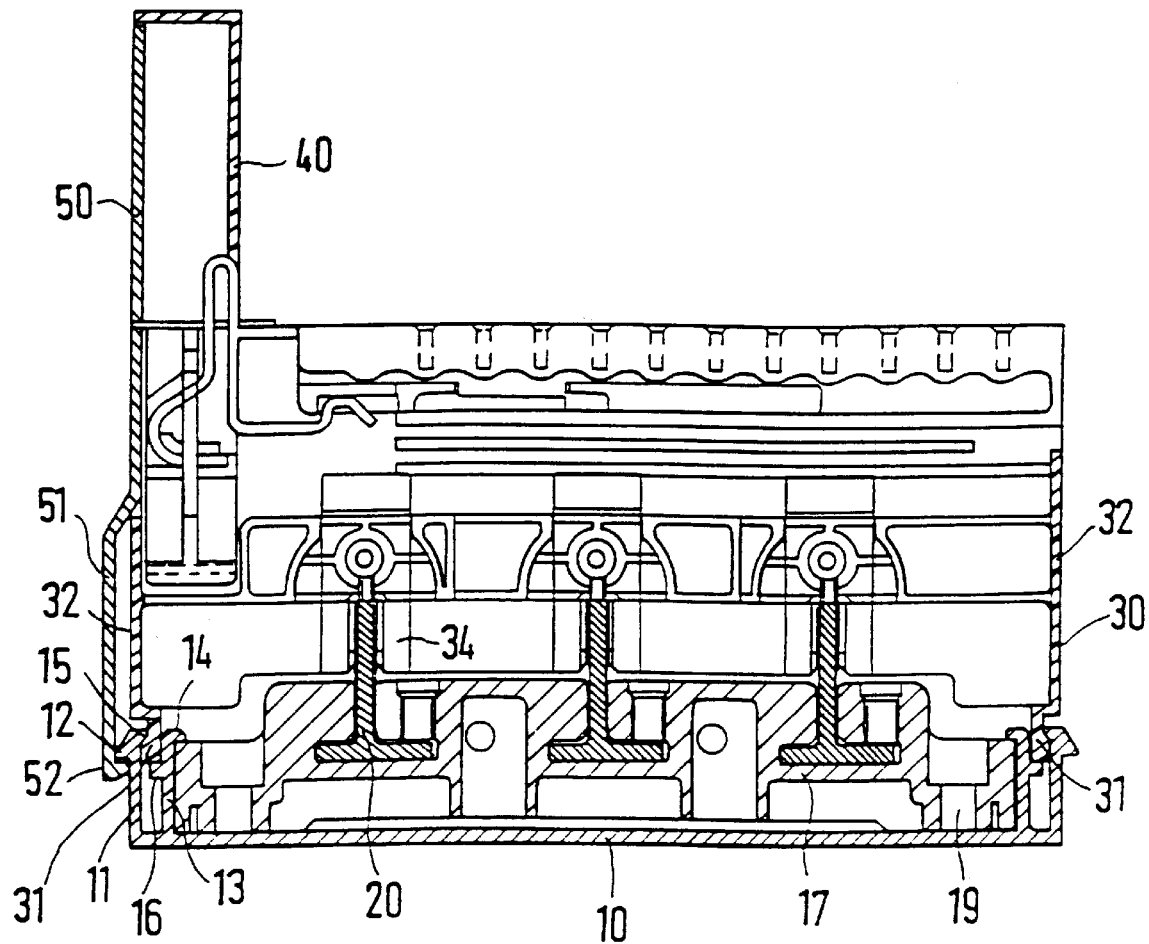
FIG. 2 is a transverse section schematically showing the mechanical connection with a tilting safeguard between an adapter embodied as an equipment adapter and the lower fastener element of the busbar system.

The partial section in FIG. 2 shows an adapter embodied as an equipment adapter, which is pushed on the busbars 20, wherein U-shaped contacts 34 provide the electrical contact. The lateral walls 32 of the adapter housing 30 extending parallel with the busbars 20 end in detent springs 31, which are snapped into the detent recesses 27 between the inner walls 13 and outer walls 11 of the lower fastener element 10.

If a connecting terminal for the lines coming from the contacts 34 is connected with the adapter housing 30, which can be provided by detent or screw connectors, it is possible to provide a tilting safeguard for the equipment adapter by means of a cover 50 as additional element. The cover 50 closes the contact block 40 and has a detent spring 51 with a detent strip 52. The detent spring 51 snaps into the longitudinal detent strap 12 of the outer wall 11. In this case securing of the busbar system is such that this outer wall is disposed on the top, if horizontal mounting of the busbar 20 is desired.

Both outer walls 11 of the lower fastener element 10 can be locked by means of detent springs 51 of additional elements, such as can be secured against yielding toward the outside. This type of locking secures the adapter on the busbar system safe against tilting, wherein the additional elements can be fastened in various ways on the adapter housing 30.

We claim:

1. In a busbar system having busbars disposed in a trough-shaped lower fastener element extending over a length of the busbars and having a clamping leg extending vertically with respect to a fastening surface of the lower fastener element into which adapters with contacts are plugged and covered, wherein the adapters are secured by mechanical detent connectors, the improvement comprising:

the lower fastener element (10) having an outer wall (11) and an inner wall (13) on both sides which form a longitudinally oriented detent recess (27), the outer wall (11) having a plurality of outwardly oriented longitudinal first detent straps (12) and the inner wall (13) having longitudinal second detent straps (15) projecting into the longitudinally oriented detent recess (27), a plurality of cover detent springs (25) provided on a plurality of cover lateral walls (28) of a first cover (23) and a plurality of adapter housing detent springs (31) provided on a plurality of housing lateral walls (32) of an adapter housing (30), said cover detent springs (25) and said adapter housing detent springs (31) extending parallel with the busbars (20) and locked into the longitudinally oriented detent recesses (27), a plurality of second covers (50) fixed on the adapter housing (30), the second covers (50) locking into the outwardly oriented longitudinal first detent straps (12) by detent springs (51) to form a tilting safeguard; and the inner wall (13) of the lower fastener element (10) having a plurality of longitudinal third detent straps (14) oriented toward an interior; and a plurality of holders (17) receiving the busbars (20) maintained in the lower fastener element (10) by the longitudinal third detent straps (14).

2. In the busbar system in accordance with claim 1, wherein the longitudinally oriented detent recesses (27) have a stop (16) which limits a snap-in movement of the cover detent springs (25) and the adapter housing detent springs (31),.

3. In the busbar system in accordance with claim 2, wherein one of the second detent straps (15) projects from the outer wall (11) and a stop (16) projects from the inner wall (13).

4. In the busbar system in accordance with claim 3, wherein the adapters are equipment adapters, a contact block (40) is fixed on the adapter housing (30), and the second covers (50) support the detent springs (51).

5. In the busbar system in accordance with claim 4, wherein the holders (17) are fixed in the lower fastener element (10) by a plurality of attachment screws (19) in an axially non-displaceable manner.

6. In the busbar system in accordance with claim 1, wherein the second detent straps (15) projecting into the detent recesses (27) are formed on the outer wall (11), and on the inner wall (13) stops (16) project into the detent recesses (27).

7. In the busbar system in accordance with claim 1, wherein the adapters are equipment adapters, a contact block (40) is fixed on the adapter housing (30), and the second covers (50) support the detent springs (51).

8. In the busbar system in accordance with claim 1, wherein a plurality of holders (17) are fixed in the lower fastener element (10) by a plurality of attachment screws (19) in an axially non-displaceable manner.

* * * * *